C. P. CHANDLER.
BOLL WEEVIL DESTROYER.
APPLICATION FILED JUNE 28, 1913.
1,087,214.
Patented Feb. 17, 1914.
3 SHEETS—SHEET 2.
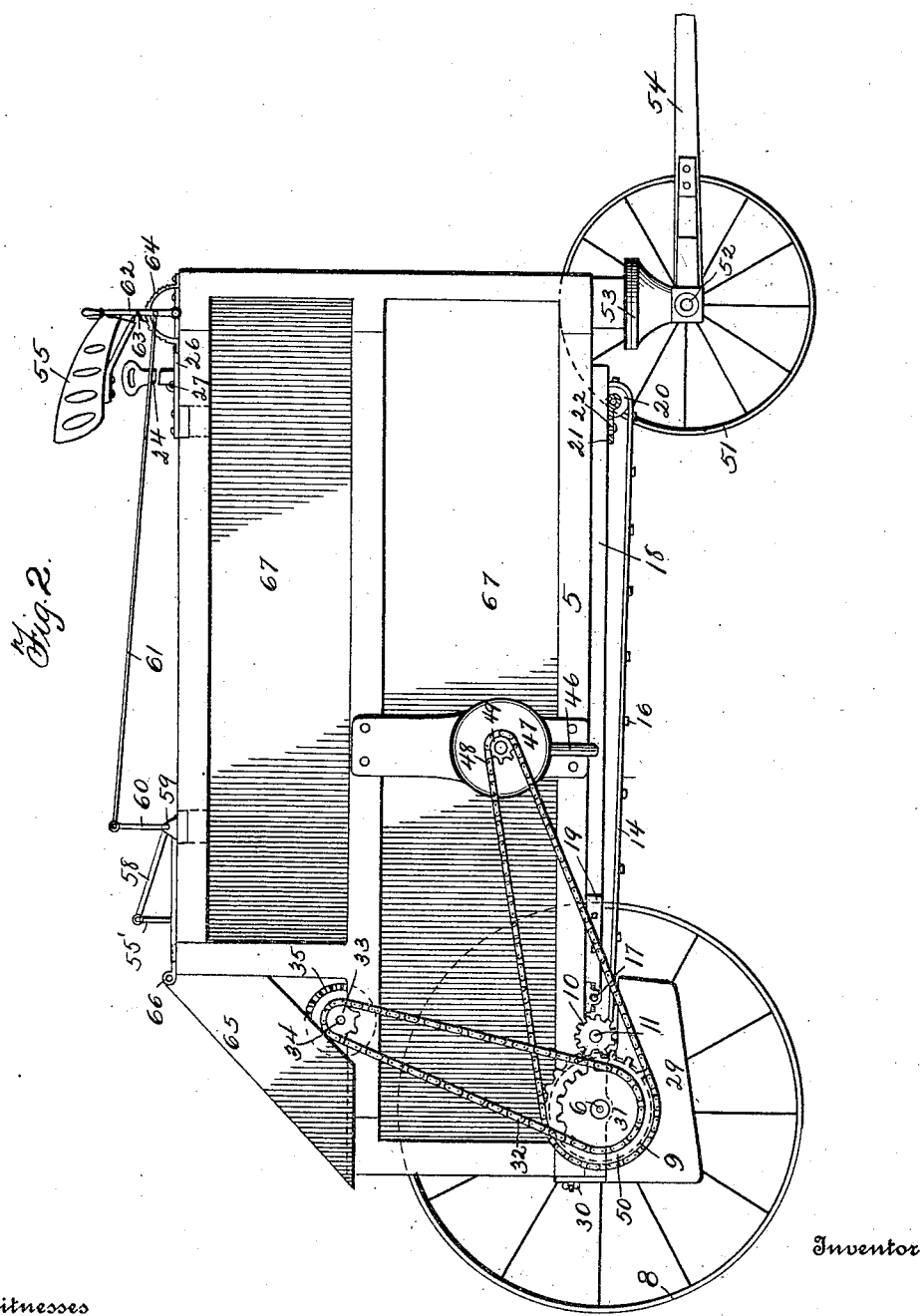
Witnesses
A. M. Murray.
J. P. Hinds.
Inventor
Columbus P. Chandler
By Shepherd & Campbell
His Attorneys C. P. CHANDLER.
BOLL WEEVIL DESTROYER.
APPLICATION FILED JUNE 28, 1913.
1,087,214.
Patented Feb. 17, 1914.
3 SHEETS—SHEET 3.
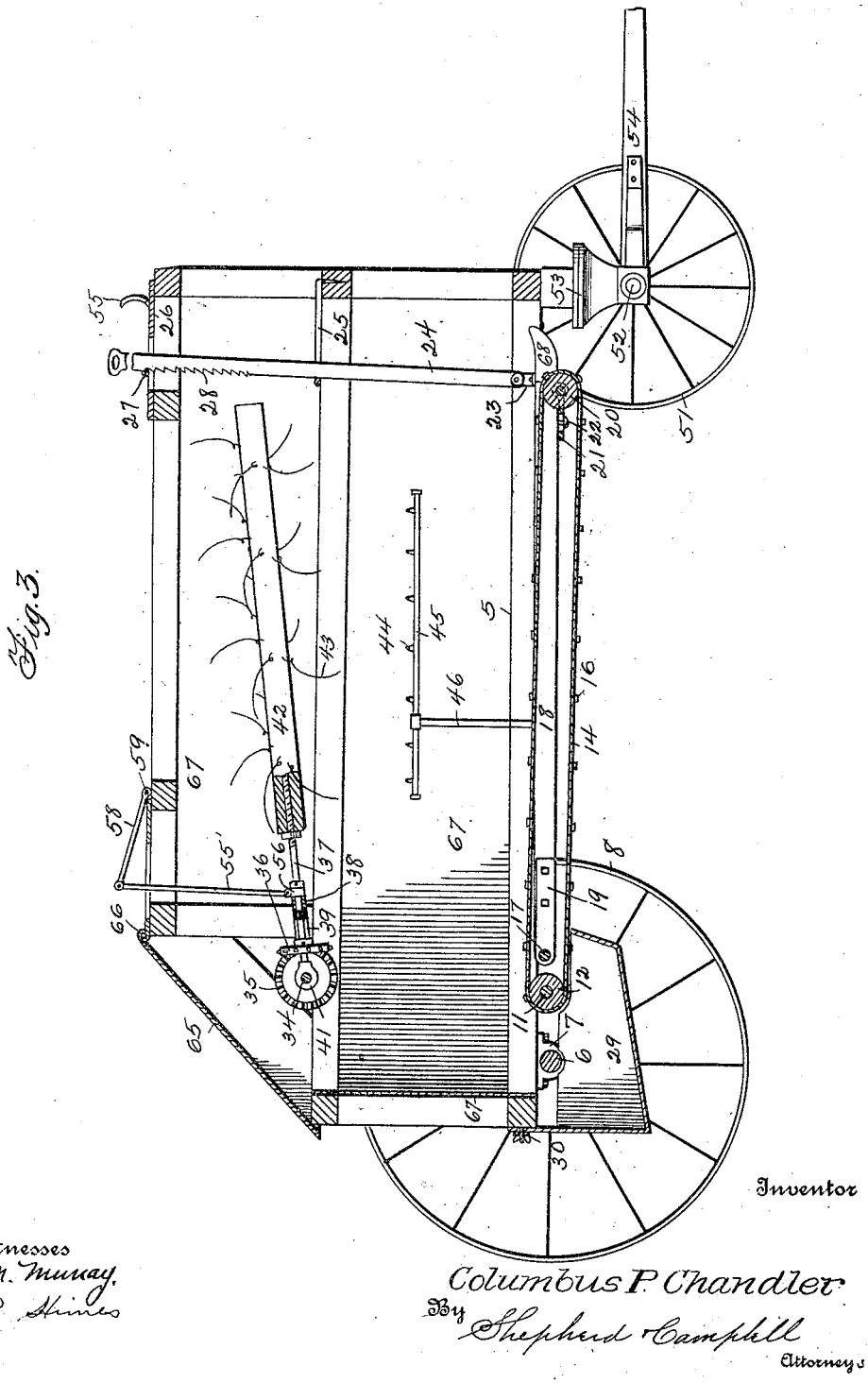
Witnesses
A. M. Murray.
J. P. Hines
Inventor
Columbus P. Chandler
By Shepherd & Campbell
Attorneys

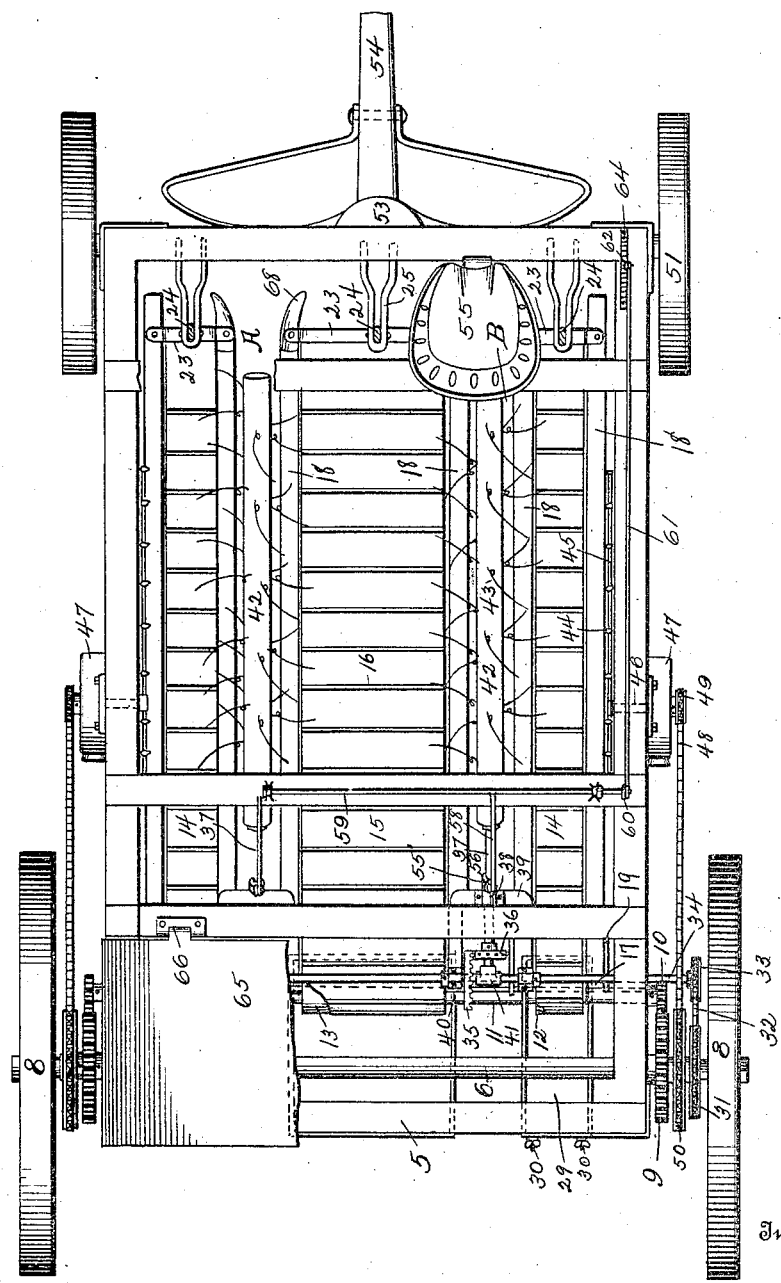

UNITED STATES PATENT OFFICE.

COLUMBUS P. CHANDLER, OF SNYDER, TEXAS.

BOLL-WEEVIL DESTROYER.

1,087,214. Specification of Letters Patent. Patented Feb. 17, 1914.

Application filed June 28, 1913. Serial No. 776,262.

*To all whom it may concern:*

Be it known that I, COLUMBUS P. CHANDLER, a citizen of the United States of America, residing at Snyder, in the county of Scurry and State of Texas, have invented certain new and useful Improvements in Boll-Weevil Destroyers, of which the following is a specification.

This invention relates to boll weevil destroyers and has for its object the provision of a machine adapted to dislodge the weevil and other noxious and destructive insects from the plants and to kill them.

The machine herein shown and described is adapted to treat two rows of plants at a time and broadly speaking, it may be said to comprise tanks carrying an insecticide, beaters for dislodging the insects from the plants, aprons or conveyers and endless conveyers or belts for carrying the dislodged insects to and discharging them into said tanks.

The machine further comprises means for creating and directing jets or blasts of air through the rows of plants simultaneously with the beating thereof to further aid in dislodging the insects.

Further objects and advantages of the invention will be set forth in the detailed description which now follows:

In the accompanying drawings, Figure 1 is a plan view of the machine constructed in accordance with the invention, Fig. 2 is a side elevation thereof, Fig. 3 is a longitudinal sectional view therethrough.

Like numerals designate corresponding parts in all of the figures of the drawings.

Referring to the drawings, the numeral 5 designates the frame of the machine. A main driving shaft 6 is mounted in bearings 7 and supports the rear end of the frame. Ground wheels 8 are mounted upon the opposite sides of this shaft and impart rotation to the shaft 6 as the machine is drawn over the ground. Shaft 6 carries a spur gear wheel 9 that meshes with a spur pinion 10 on a transverse shaft 11. Shaft 11 carries rollers 12 and 13. There are two of the rollers 12, only one of these rollers being shown, however, in Fig. 1.

Canvas belts 14 and 15 pass over the rollers 12 and 13 respectively and these belts are provided with cross bars 16 preferably formed of leather, though the invention is not limited in this respect as any form of cross bars or cleats may be employed. A transverse shaft 17 is mounted in the frame immediately in advance of shaft 11 and serves as a support for swingingly mounted bars 18 arranged in pairs upon opposite sides of the belts 14 and 15. At their rear ends, these bars are provided with iron straps 19 through which shaft 17 passes, and it will be seen that passageways A and B are thus left upon each side of belt 13 and between said belt and the adjacent belt 14 for the reception of the rows of plants. Each pair of bars 18 carries at its forward end a roller 20 over which the belts pass and it is apparent that the upper flights of these belts will be caused to travel rearwardly when forward motion is imparted to the machine.

The rollers 20 are mounted in bearings 21 that are slotted for the reception of bolts 22, by virtue of which construction the belts may be adjusted longitudinally with relation to the bars 18, to thereby vary the tension of the belts. The forward end of each pair of bars is spanned by a yoke 23 to which an operating lever 24 is secured. These operating levers pass through guides 25 and 26, and the guides 26 are provided with cross bars 27 adapted to be engaged by teeth 28 of the operating levers, to thereby provide means for vertically adjusting the forward ends of bars 18 in a manner that will be readily understood.

The insects carried rearwardly by the upper flights of the belts are discharged into receptacles 29 that are removably supported at 30 from the rear cross bar of the machine frame, these receptacles being adapted to contain kerosene or other insecticide by which the insects are killed.

The shaft 6 carries a sprocket wheel 31 which, through the medium of a sprocket chain 32, drives a sprocket wheel 33 upon a transverse shaft 34. Crown gears 35 upon shaft 34 drive spur gears 36 upon shafts 37. These shafts 37 have bearings at 38 in yokes 39 and the yokes 39 have bearings at 40 upon shaft 34. The inner ends of shafts 37 also have bearing at 41 upon shaft 34. The outer ends of shaft 37 have threaded engagement with the bodies 42 of the beaters. The beater fingers 43 are spirally arranged about the bodies 42 and it is apparent that through the connections described, rotation will be imparted to these bodies to cause the beater fingers to beat the rows of plants, thereby the insects are dislodged and caused to fall upon the belts 14 and 15. This action is further aided by jets or blasts of air discharged through nozzles 44 mounted upon pipes 45, and supplied through hose 46 leading from fan or blower casings 47. The fans or blowers are driven through the medium of sprocket chains 48, small sprocket wheels 49 and large sprocket wheels 50, the latter being mounted upon shaft 6.

The forward end of the frame is supported upon ground wheels 51 mounted upon front axle 52 provided with the usual fifth wheel 53 and tongue 54 for the purpose of attaching draft animals to the machine. A driver's seat 55 is arranged upon the top of the frame and to provide means for vertically adjusting the beaters, links 55' are pivoted to collars 56 embracing shafts 37 and the upper ends of these links are pivotally connected to crank arms 58 upon a transverse shaft 59. This shaft carries a crank arm 60 that is connected by a link 61 with a lever 62. This lever has a latch 63 movable over an arcuate rack 64 in the usual and well known manner. This provides means accessible from the driver's seat for accomplishing the object set forth, viz., imparting swinging movement to yokes 39 around shaft 34 to thereby vertically adjust the beaters to accommodate plants of varying heights.

A hood 65 is hingedly connected to the frame at 66 and covers the upper rear portion thereof, to prevent the insects dislodged from being blown out from the rear end of the machine. This hood directs the insects downwardly and causes those dislodged but which do not fall upon the belts, to fall into the tanks direct.

The machine frame comprises inner metallic linings indicated at 67 to prevent the accidental passage of the insects through the sides of the machine. To aid in directing the stalks of the plants into the passages A and B, the bars 18 upon opposite sides of said passageways are curved at their forward ends to form horns and these horns are covered with metallic shields 68.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described, the combination with a frame, ground wheels, a rotative shaft upon which said ground wheels are secured, a transverse shaft, means for driving said transverse shaft from the first named shaft, rollers carried by the transverse shaft, a plurality of bars extending longitudinally of the machine frame arranged in pairs and having swinging mounting at their rear ends, rollers carried by said bars adjacent their forward ends, belts passed over the last named rollers and over the first named rollers, beaters extending longitudinally of the machine frame, a beater driving shaft, means for driving said beater driving shaft from the first named shaft, yokes having swinging mounting upon the beater driving shaft, beater shafts journaled in said yokes, and gearing between said beater shafts and said beater driving shafts.

2. In a device of the character described, the combination with a frame, ground wheels, a rotative shaft upon which said ground wheels are secured, a transverse shaft, means for driving said transverse shaft from the first named shaft, rollers carried by the transverse shaft, a plurality of bars extending longitudinally of the machine frame arranged in pairs and having swinging mounting at their rear ends, rollers carried by said bars adjacent their forward ends, belts passed over the last named rollers and over the first named rollers, beaters extending longitudinally of the machine frame, a beater driving shaft, means for driving said beater driving shaft from the first named shaft, yokes having swinging mounting upon the beater driving shaft, beater shafts journaled in said yokes, gearing between said beater shafts and said beater driving shafts, air discharging nozzles, blowers for supplying air thereto, and means for driving said blowers from the first named shaft.

3. In a device of the character described, the combination with a frame, ground wheels, a rotative shaft upon which said ground wheels are secured, a transverse shaft, means for driving said transverse shaft from the first named shaft, rollers carried by the transverse shaft, a plurality of bars extending longitudinally of the machine frame arranged in pairs and having swinging mounting at their rear ends, rollers carried by said bars adjacent their forward ends, belts passed over the last named rollers and over the first named rollers, beaters extending longitudinally of the machine frame, a beater driving shaft, means for driving said beater driving shaft from the first named shaft, yokes having swinging mounting upon the beater driving shaft, beater shafts journaled in said yokes, gearing between said beater shafts and said beater driving shafts, and manually operable means for raising and lowering the forward ends of said bars.

4. In a device of the character described, the combination with a frame, ground wheels, a rotative shaft upon which said ground wheels are secured, a transverse shaft, means for driving said transverse shaft from the first named shaft, rollers carried by the transverse shaft, a plurality of bars extending longitudinally of the machine frame arranged in pairs and having swinging mounting at their rear ends, rollers carried by said bars adjacent their forward ends, belts passed over the last named rollers and over the first named rollers, beaters extending longitudinally of the machine frame, a beater driving shaft, means for driving said beater driving shaft from the first named shaft, yokes having swinging mounting upon the beater driving shaft, beater shafts journaled in said yokes, gearing between said beater shafts and said beater driving shafts, and means for raising and lowering said beaters.

5. In a device of the character described, the combination with a frame, ground wheels, a rotative shaft upon which said ground wheels are secured, a transverse shaft, means for driving said transverse shaft from the first named shaft, rollers carried by the transverse shaft, a plurality of bars extending longitudinally of the machine frame arranged in pairs and having swinging mounting at their rear ends, rollers carried by said bars adjacent their forward ends, belts passed over the last named rollers and over the first named rollers, beaters extending longitudinally of the machine frame, a beater driving shaft, means for driving said beater driving shaft, from the first named shaft, yokes having swinging mounting upon the beater driving shaft, beater shafts journaled in said yokes, gearing between said beater shafts and said beater driving shafts, a driver's seat, and manually operable means for raising and lowering said beaters from said driver's seat.

In testimony whereof I affix my signature in presence of two witnesses.

COLUMBUS P. CHANDLER.

Witnesses:
WM. ELSON CAPERTON,
JUDSON F. COOK.